United States Patent
Palfer-Sollier et al.

(10) Patent No.: US 11,461,234 B2
(45) Date of Patent: Oct. 4, 2022

(54) COHERENT NODE CONTROLLER

(71) Applicant: NUMASCALE AS, Oslo (NO)

(72) Inventors: Thibaut Palfer-Sollier, Oslo (NO); Einar Rustad, Oslo (NO); Steffen Persvold, Oslo (NO)

(73) Assignee: Numascale AS, Oslo (NO)

( * ) Notice: Subject to any disclaimer, the term of this patent is extended or adjusted under 35 U.S.C. 154(b) by 83 days.

(21) Appl. No.: 16/644,032

(22) PCT Filed: Jun. 4, 2018

(86) PCT No.: PCT/NO2018/050146
§ 371 (c)(1),
(2) Date: Mar. 3, 2020

(87) PCT Pub. No.: WO2019/050411
PCT Pub. Date: Mar. 14, 2019

(65) Prior Publication Data
US 2021/0064530 A1   Mar. 4, 2021

(30) Foreign Application Priority Data
Sep. 5, 2017  (NO) .................................. 20171434

(51) Int. Cl.
*G06F 12/08* (2016.01)
*G06F 12/0815* (2016.01)

(52) U.S. Cl.
CPC .... *G06F 12/0815* (2013.01); *G06F 2212/621* (2013.01)

(58) Field of Classification Search
None
See application file for complete search history.

(56) References Cited

U.S. PATENT DOCUMENTS

| 6,092,155 A | 7/2000 | Olnowich | |
| 8,990,501 B1 * | 3/2015 | Sellers | G06F 12/0811 711/121 |
| 9,648,102 B1 | 5/2017 | Davis et al. | |
| 2003/0163649 A1 * | 8/2003 | Kapur | G06F 12/0862 711/146 |
| 2006/0092957 A1 * | 5/2006 | Yamazaki | G06F 12/0835 370/402 |
| 2008/0270708 A1 | 10/2008 | Warner et al. | |

(Continued)

OTHER PUBLICATIONS

International Search Report issued by the European Patent Office acting as the International Searching Authority in relation to International Application No. PCT/NO2018/050146 dated Feb. 10, 2018 (4 pages).

(Continued)

*Primary Examiner* — Kaushikkumar M Patel
(74) *Attorney, Agent, or Firm* — Osha Bergman Watanabe & Burton LLP (57) ABSTRACT

A cache coherent node controller at least includes one or more network interface controllers, each network interface controller includes at least one network interface, and at least two coherent interfaces each configured for communication with a microprocessor. A computer system includes one or more of nodes wherein each node is connected to at least one network switch, each node at least includes a cache coherent node controller.

12 Claims, 6 Drawing Sheets

(56) References Cited

U.S. PATENT DOCUMENTS

| | | | |
|---|---|---|---|
| 2009/0157976 A1 | 6/2009 | Comparan et al. | |
| 2010/0235662 A1* | 9/2010 | Nishtala | G06F 1/3203 713/322 |
| 2012/0089787 A1* | 4/2012 | Watson, Jr. | G06F 12/0815 711/141 |
| 2013/0125097 A1 | 5/2013 | Ebcioglu et al. | |
| 2014/0201326 A1 | 7/2014 | Joshua et al. | |
| 2015/0186277 A1 | 7/2015 | Rowlands et al. | |
| 2015/0242324 A1 | 8/2015 | Novakovic et al. | |
| 2016/0378701 A1* | 12/2016 | Niell | G06F 12/0831 710/308 |
| 2018/0267741 A1* | 9/2018 | Blake | G06F 3/0653 |
| 2019/0199833 A1* | 6/2019 | Hasegawa | H04L 1/18 |

OTHER PUBLICATIONS

Written Opinion of the International Searching Authority issued by the European Patent Office acting as the International Searching Authority in relation to International Application No. PCT/NO2018/050146 dated Feb. 10, 2018 (5 pages).

Norwegian Search Report issued by the Norwegian Patent Office in relation to Norwegian U.S. Appl. No. 20171434 dated Feb. 28, 2018 (2 pages).

International Preliminary Report on Patentability issued by the European Patent Office acting as the International Preliminary Examining Authority in relation to International Application No. PCT/NO2018/050146 dated Dec. 4, 2019 (7 pages).

\* cited by examiner

6 x 8 = 48 nodes

Fig. 8a 6 x 8 x 6 = 288 nodes

COHERENT NODE CONTROLLER

CROSS-REFERENCE TO RELATED APPLICATIONS

This application is a national phase entry under 35 U.S.C. 371 of PCT International Application No. PCT/NO2018/050146 filed Jun. 4, 2018, which claims priority to Norwegian Patent Application No. 20171434, filed Sep. 5, 2017, the disclosure of each of these applications is expressly incorporated herein by reference in their entirety.

TECHNICAL FIELD

The present invention relates to architecture for multiprocessors and more particularly to a multi-port node controller.

BACKGROUND ART

Modern processors have capabilities of interconnecting a relatively low number of processor modules to form larger systems by direct connections between the processors across point-to-point links. These links are not capable of expanding the system size beyond typically 4-8 modules, although some may go as far as a maximum of 16. Each processor module contains several CPU cores that may be integrated on a single die or a combination of two or more dies in a multi-chip module. For performance reasons, the directly connected systems are limited to 8 modules due to the increasing overhead due to the task of maintaining data coherency across all memories and high speed caches in the system.

Modern high performance computing (HPC) systems normally use nodes with 2-CPU sockets that are connected to an interconnect switch through a network interface controller (NIC).

The present invention is designed to solve several of the most pressing problems with very large scale computer systems. One of the major problems is the amount of energy that it takes to drive inter-node signals through an interconnect switching system. Another is the number of operating system instances that are needed to handle the resources contained in each node. Reducing this number will contribute to better efficiency and utilization of resources and it will also be more flexible for running programs of various sizes and complexities.

Background art is found in US 2008/0270708 A1, Warner et al. titled System And Method for Achieving Cache Coherency Within Multiprocessor Computer System, further reference is made to U.S. Pat. No. 6,092,155 (Olnowich) and US 2014/0201326 A1 (Joshua et al.).

US 2015/0242324 A1 describes a system that uses a Scale-Out NUMA architecture, programming model, and or communication protocol for in-memory processing. US 2013/0125097 A1 describes a compilation method for automatically converting a single-threaded software program into an application-specific supercomputer and a related supercomputer system structure generated as a result of the software program. Furthermore, the U.S. Pat. No. 9,648,102 B1 describes a Memcached server functionality in a cluster of data processing nodes.

DISCLOSURE OF INVENTION

It is one object of the invention to provide systems and methods that do not suffer from the problems indicated above. By introducing a multi-ported node controller, the number of nodes in a large system can be reduced in proportion with the number of coherent ports on the node controller. The processor modules that are connected to the node controller will communicate through on-chip parallel data paths and thereby increasing throughput, reducing latency and reducing power consumption by eliminating the need to drive external wires for the communication between the processor modules in the node.

This and other objects are met by a computer system at least comprising two CNCNICs and a network switch.

In a computer system multi-port interconnect modules may contain multiple instances of protocol transaction processing engines that perform the necessary transactions on directories and tags to maintain the system wide cache and memory coherency.

More particularly according to one embodiment it is provided a cache coherent node controller at least comprising:

a. one or more network interface controllers, each network interface controller includes at least one network interface, and
b. at least two coherent interfaces each configured for communication with a microprocessor. The cache coherent controller may further comprise:
c. one or more interconnected protocol engines,
d. one or more coherent link layers, each coherent link layer at least connected to one protocol engine, each coherent link layer provides coherent interfaces.

According to another embodiment it is provided a computer system comprising one or more nodes where each node is connected to at least one network switch, each node at least comprising:

e. a cache coherent node controller at least comprising:
  i. one or more network interface controllers, each network interface controller includes at least one network interface, and
  ii. at least two coherent interfaces each connected to a microprocessor.

The cache coherent node controller of the computer system may further comprise:
  iii. one or more interconnected protocol engines,
  iv. one or more coherent link layers, each coherent link layer at least connected to one protocol engine, each coherent link layer provides coherent interfaces.

Connection between each node and the network switches can be provided by the network interfaces.

According to one aspect of the system one network interface of each cache coherent node controller can be connected to one network switch to form a 1-dimensional fat tree topology.

In another aspect two network interfaces of each cache coherent node controller can be connected to two network switches to form a 2-dimensional fat tree topology.

In yet an aspect of the invention three network interfaces of each cache coherent node controller can be connected to three network switches to form a 3-dimensional fat tree topology.

In yet an aspect four network interfaces of each cache coherent node controller can be connected to four network switches to form a 4-dimensional fat tree topology.

In yet an aspect n network interfaces of each cache coherent node controller can be connected to n network switches to form an n-dimensional fat tree topology.

A system according to claim 5 where the network switches are one of: an Omnipath switch, an InfiniBand switch, a Gen-Z switch or an Ethernet switch.

A system according to claim 5 where connection between each node and the network switches is provided by fibre optic links to the network switches.

Other advantageous features will be apparent from the accompanying claims.

BRIEF DESCRIPTION OF DRAWINGS

Following is a brief description of the drawings in order to make the invention more readily understandable, the discussion that follows will refer to the accompanying drawings, in which FIGS. 5, 7, 8a and 8b, use a simplified ring depicting a node with two or more CPUs and two or more NIC channels.

DETAILED DESCRIPTION OF THE INVENTION

In the following it is firstly disclosed general embodiments in accordance to the present invention, thereafter particular exemplary embodiments will be described. Where possible reference will be made to the accompanying drawings and where possible using reference numerals in the drawings. It shall be noted however that the drawings are exemplary embodiments only and other features and embodiments may well be within the scope of the invention as described.

In the context of the present invention a processor is defined as a module containing one or more CPU cores, one or more memory channels, one or more I/O channels, one or more coherent links and memory in the form caches or with or without main memory in any form included in the processor module.

A node contains one or more processor modules, one or more memory banks, zero or one or more I/O modules and one or more coherent node controllers.

In the present invention it is not necessarily different bandwidths within a fat tree configuration as indicated in the figures.

The present invention is based on integrating several functions that in combination will produce a flexible and versatile interconnect component for building large scale computer systems. The key of the invention is the close connection between a packet-based network switch and a cache coherent switch for inter-processor communication inside the node. This connection enables building of scalable systems with low latency and high bandwidth communication with very low power consumption. As an example, a device with 8 coherent links to CPUs and 4 interconnect links to connect to other devices of the same kind will consume less than 100 W of power. Such a device will reduce the main system interconnect port requirement with a factor of four compared to the traditional configuration for HPC systems with 2 CPUs per network interface.

A Network Interface Controller, NIC, can be implemented for use with different types of high performance networks like Ethernet, InfiniBand, Omnipath (Intel), BXI (ATOS/Bull), and Gen-Z (Gen-Z consortium standard). Gen-Z defines a load/store architecture where CPU instructions can address memory directly without going through a message passing protocol through software driver layers. Omnipath has a similar function in addition to RDMA functionality for message passing. The ability for processors to use load and store instructions to operate directly on memory locations across the interconnect reduces the overhead for data movement. This is most important for short data transfers where latency and overhead becomes a significant factor for performance.

First Embodiment of the Present Invention

The present invention will now be described with a specified example. The invention introduces a new element, namely a cache coherent node controller, it also provides examples of the use of said new element in system configurations from 1-dimensional fat tree configurations to n-dimensional fat tree configurations.

Figure 1:
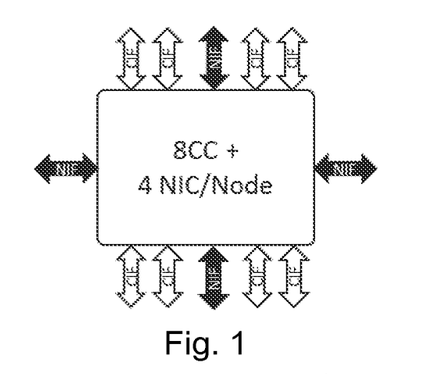
FIG. 1 shows a simplified drawing of an 8-port cache coherent node controller with 4 integrated network interfaces. Configurations require one or more cache coherent ports and one or more network interfaces.
Figure 2:
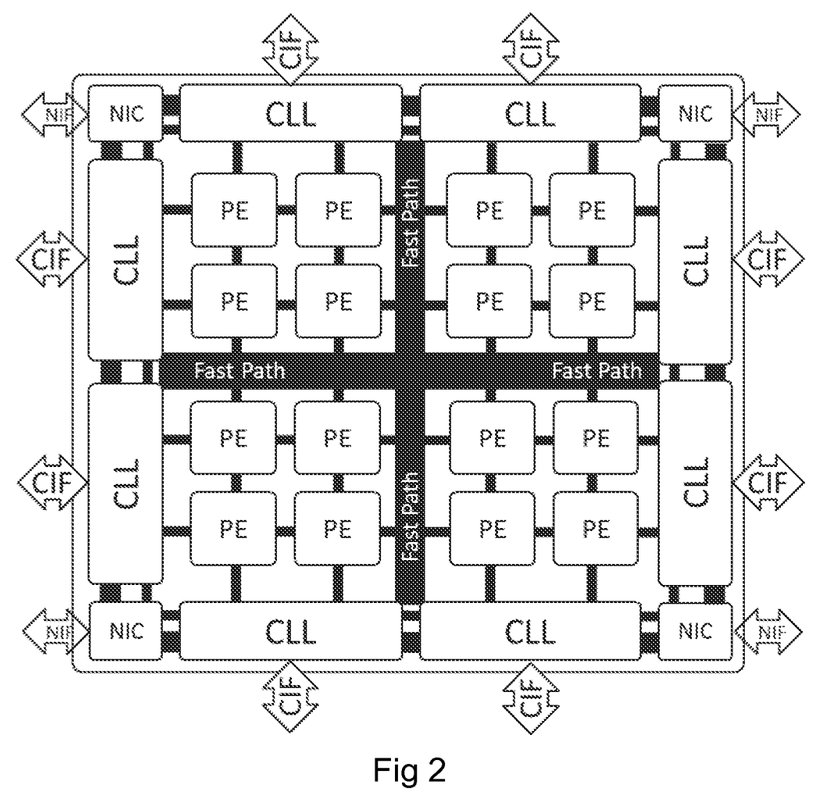
FIG. 2 shows 8 cache coherent links to CPUs and 4 network interfaces (NICs) to connect to HPC switches with various number of ports. The 4 NICs allow configurations with up to 4 dimensional fat trees.
Figure 3:
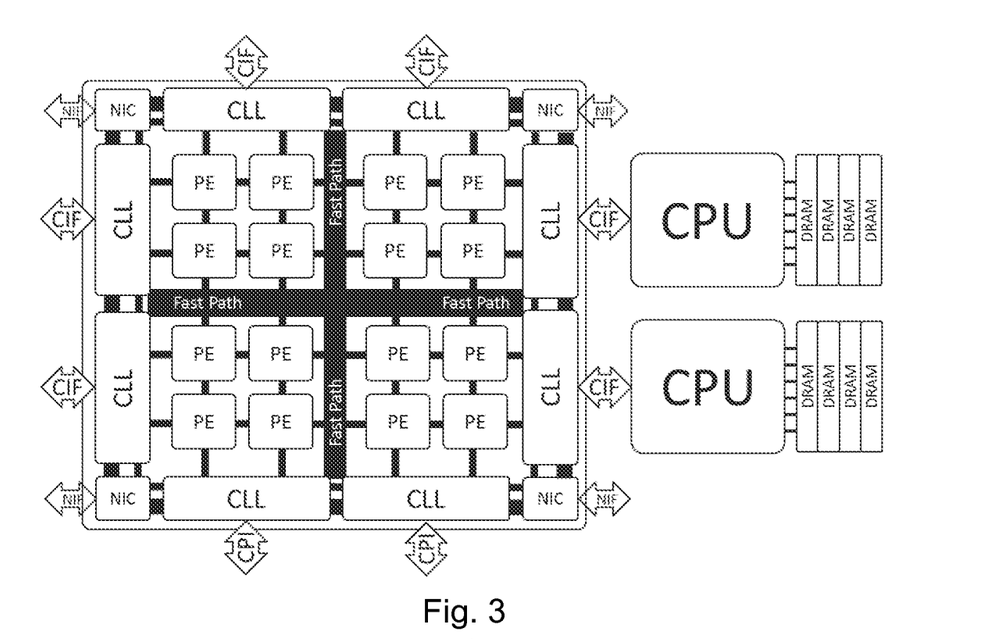
FIG. 3 shows CPU connections.
Figure 4:
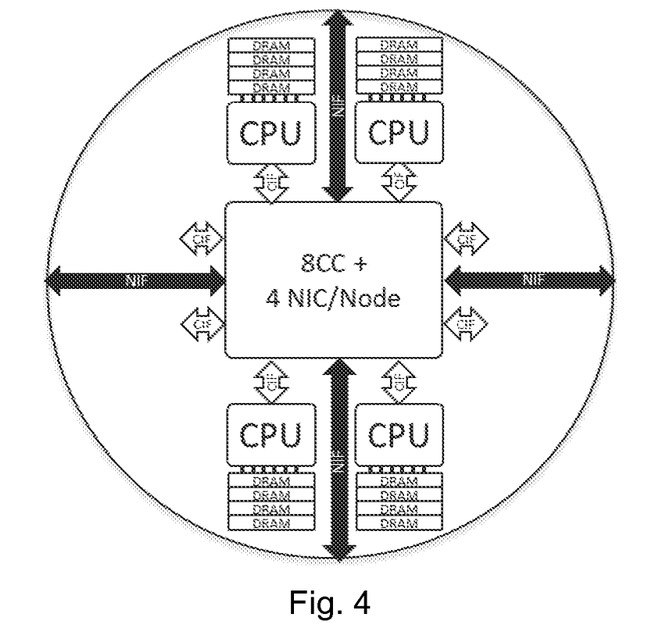
FIG. 4 shows a simplified drawing of an 8-port cache coherent node controller with 4 integrated network interfaces and 4 connected CPUs. Configurations require one or more cache coherent ports and one or more network interfaces.

The cache coherent node controller may at least comprise:
a. one or more network interface controllers, each network interface controller includes at least one network interface. An example of such a coherent node controller is shown schematically in FIG. 1 and more detailed in FIG. 2. It can be seen in FIG. 2 that the node controller includes 4 NI Cs and each N IC includes at least one network interface port. The NICs are configured for communication with network switches.
b. at least two coherent interfaces each configured for communication with a microprocessor. In FIG. 2 it is shown eight coherent link layers, CLL. Each of the CLLs at least comprises a coherent interface port.
c. one or more interconnected protocol engines. The protocol engines are shown in FIG. 2 as squares marked PE. FIG. 2 indicates 16 PEs. Each PE is connected directly or indirectly to a CLL. PEs are interconnected directly or indirectly.

The cache coherent node controller can be scaled up or down maintaining the same principle of incorporating one or more NICs.

Obviously, the design layout shown in FIG. 2 with NICs arranged in the corner is a design matter, also it makes the figure readily understandable.

Second Embodiment of the Present Invention

In the second embodiment of the present invention the coherent node controller with NICs described above is used in a computer system. The computer system comprises one or more nodes where each node is connected to at least one network switch, FIGS. 5, 7. 8a, 8b and 9. Each node is described in the section above, the first embodiment of the present invention.

Figure 5:
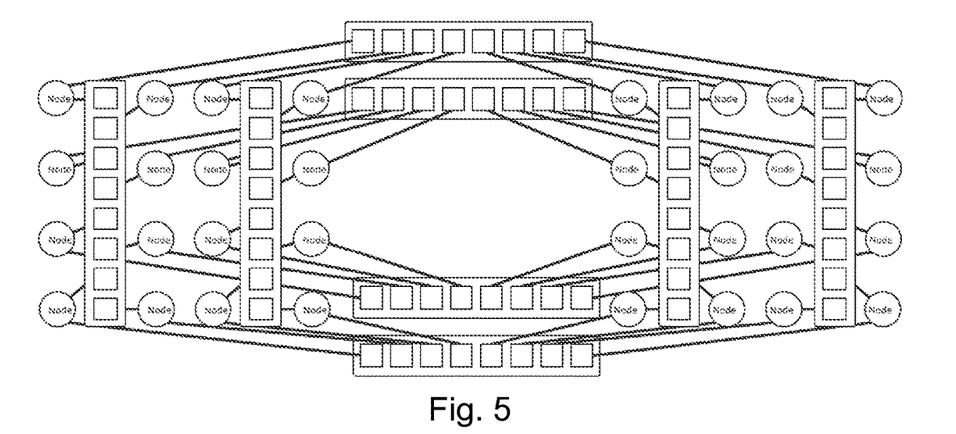
FIG. 5 shows a 2-D fat tree system with 32 nodes.
Figure 6:
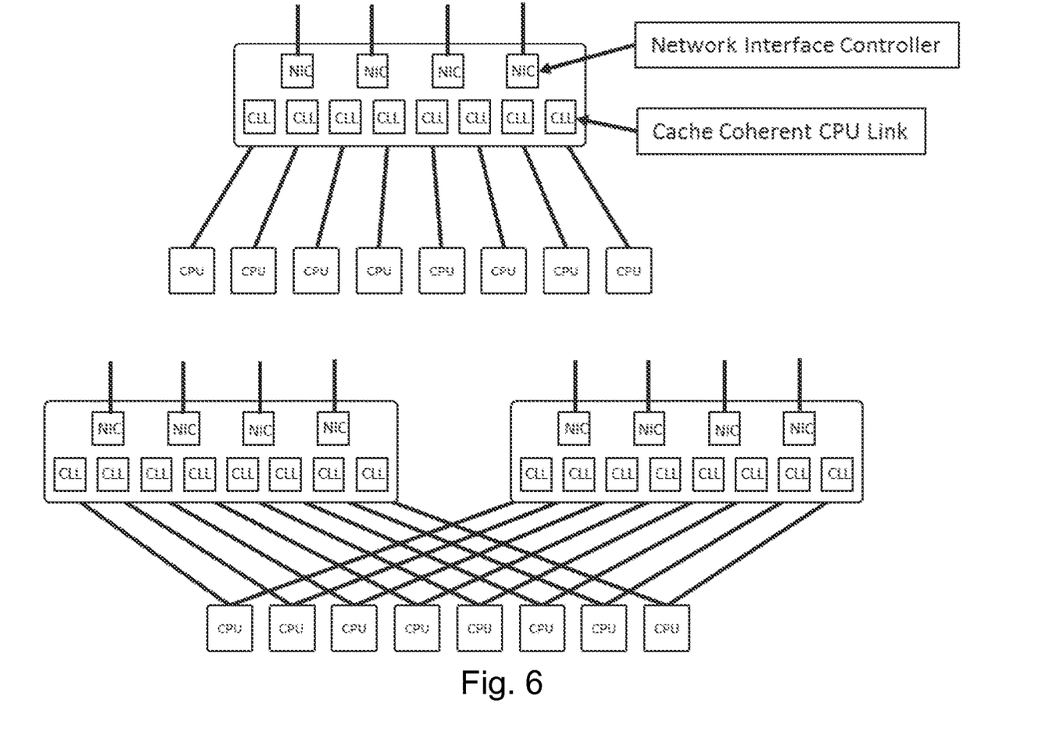
FIG. 6 shows a 1-D fat tree, with 8-node configurations, where top: 8 nodes is associated with one 8-port node controller and bottom 8 nodes are associated with two 8-port node controllers for double bandwidth and redundancy.

In the event that only one NIC is included or only one NIC is connected to network switches one will have a one dimensional system as depicted in FIG. 6. In FIG. 5 it is shown a two-dimensional system, i.e. two NICs in each cache coherent node controller is connected to a network switch.

Figure 7:
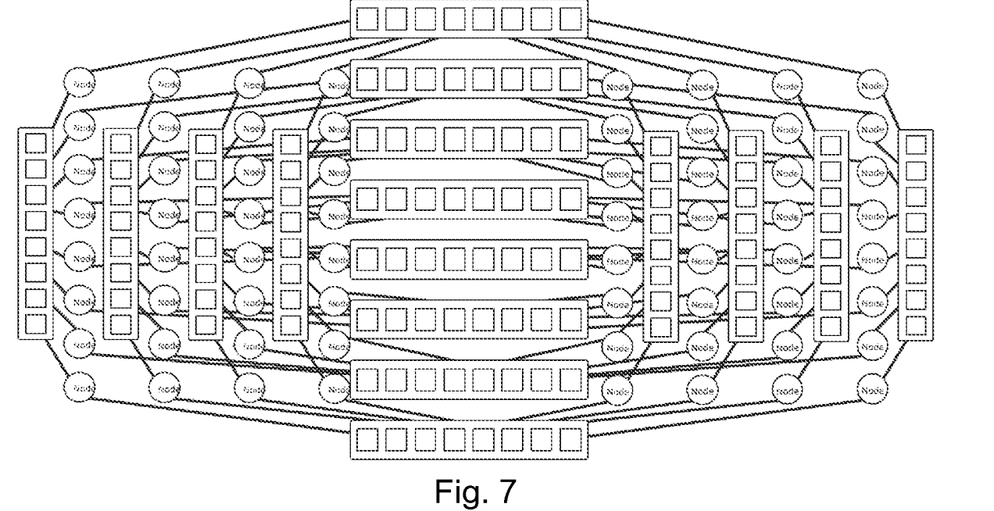
FIG. 7 shows a 2-D fat tree system with 64 nodes.
Figure 8A:
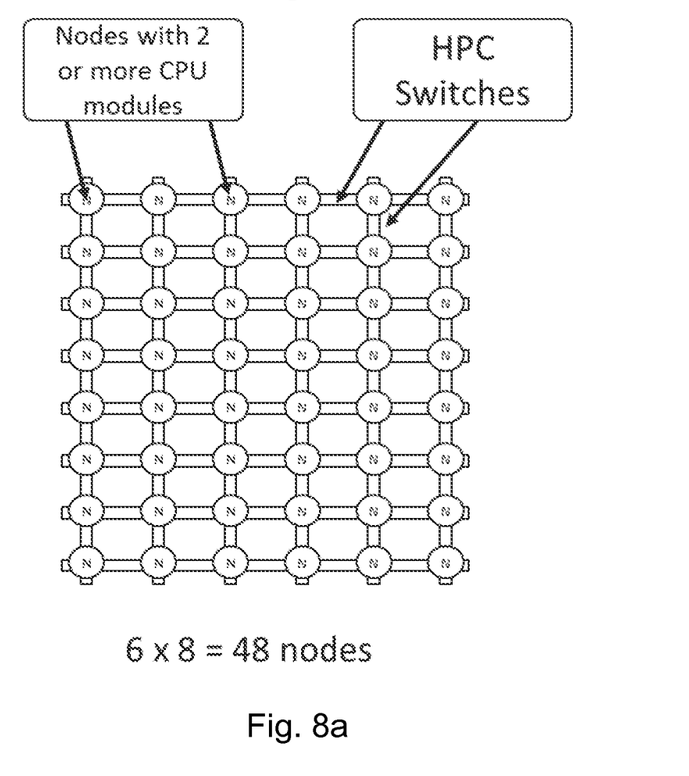
FIG. 8a shows a 2D face of with 48 nodes of a 3-D fat tree system.
Figure 8B:
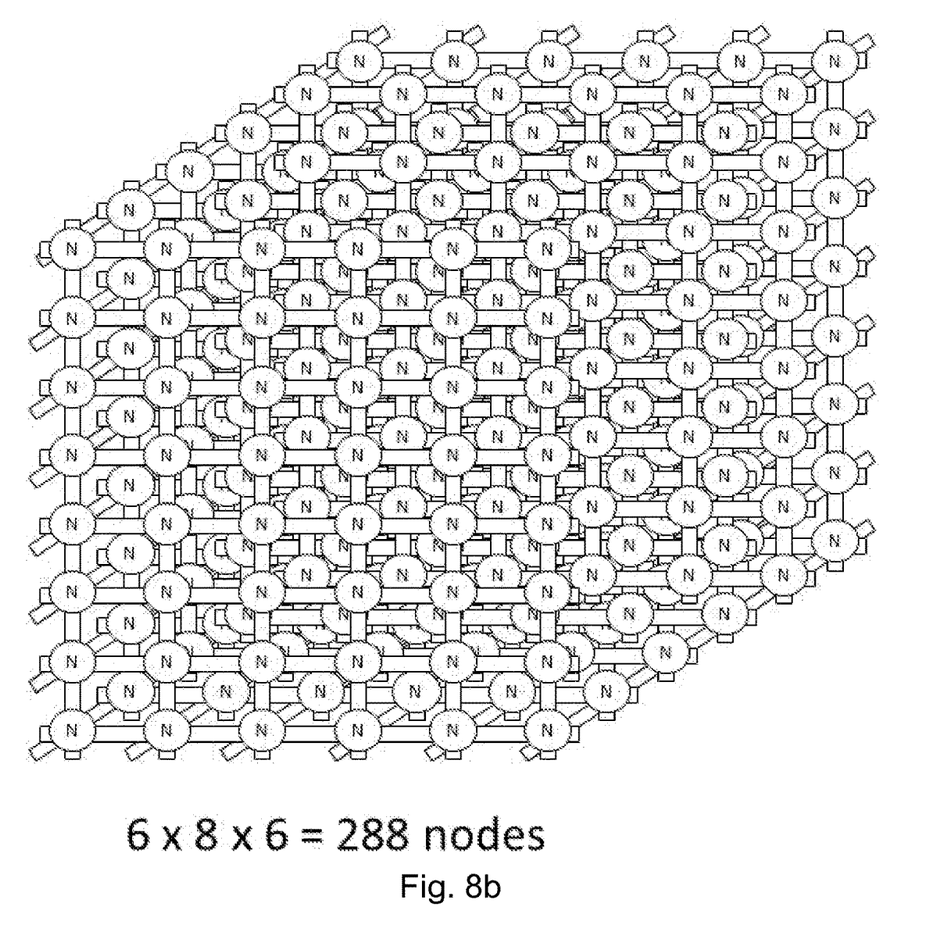
FIG. 8b shows a 3-D fat tree system with 6×8×6 nodes.
Figure 9:
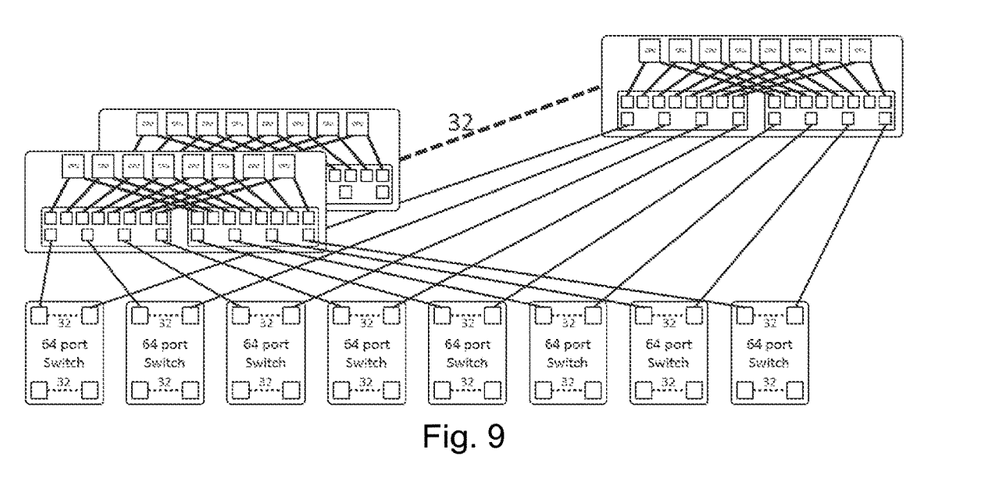
FIG. 9 shows a fat tree configuration in a rack, where a node includes 8 cache coherent, a rack contains 32 nodes, 8×64 port Switches, Message Passing Total: 256 CPU's.
Figure 10:
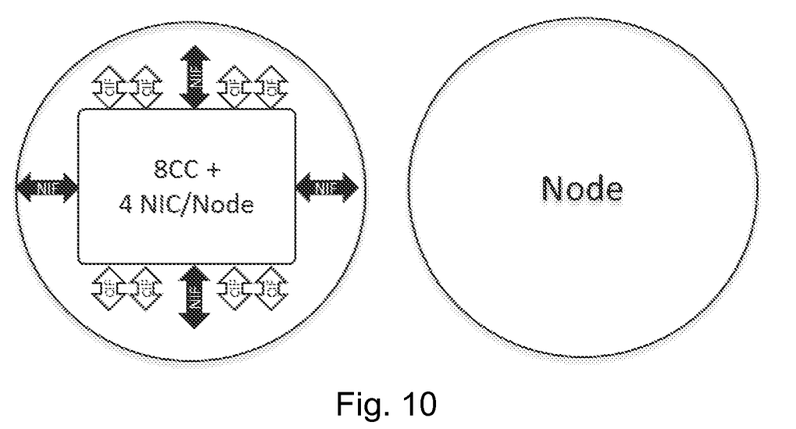
FIG. 10 shows a simplified drawing of an 8-port cache coherent node controller with 4 integrated network interfaces. Configurations require one or more cache coherent ports and one or more network interfaces. Further drawing use a simplified ring depicting a node with two or more CPUs and two or more NIC channels.

FIG. 7 shows a three dimensional system, that is; each NIC is connected with three networks switches. FIG. 8a shows a front layer of a three dimensional system whilst FIG. 8b shows a three dimensional system with all layers. The configuration in FIG. 8b is 6×8×6 nodes.

The cache coherent node controller of FIG. 2, is configured for four dimensional systems.

| | |
|---|---|
| 100a, 100b, 100c, 100d | A computer, a server or a blade server - above referred to as a node |
| 200 | On-chip distributed switching, such as but not limited to. Ethernet switch, Omnipath switch, Infiniband switch, and Gen-Z switch. |
| CIF | Coherent Interface |
| CLL | Coherent Link Layer |
| NIC | Network Interface Controllers |
| NIF | Network Interface |
| PE | Protocol Engine |
| HPC | High performance computing |
| CNCNIC | Coherent Node Controller w/Integrated NICs |
| CPU | Central Processing Unit |
| RDMA | Remote direct memory access |

The invention claimed is:

1. A cache coherent node controller comprising:
a network interface controller (NIC) that includes an integrated network interface configured for communication using a first port in an integrated circuit,
a coherent interface (CIF) configured for communication with a microprocessor, wherein the coherent interface uses a second port in the integrated circuit that is different from the first port,
a plurality of interconnected protocol engines (PE), and
a plurality of coherent link layers connected to the plurality of interconnected protocol engines, wherein a first coherent link layer of the plurality of coherent link layers provides the coherent interface, and
wherein the network interface controller is connected with the plurality of coherent link layers.

2. A computer system comprising:
a node connected to a plurality of network switches, wherein the node comprises:
a cache coherent node controller comprising an integrated circuit, wherein the integrated circuit comprises:
a network interface controller that includes an integrated network interface,
wherein the integrated network interface is configured for communication over at least one network switch among the plurality of network switches using a first port in the integrated circuit,
a coherent interface configured for communication with a microprocessor,
wherein the coherent interface uses a second port in the integrated circuit for communication with the microprocessor and that is different from the first port, and
a plurality of interconnected protocol engines (PE).

3. The computer system according to claim 2, wherein the integrated circuit in the cache coherent node controller further comprises:
a plurality of coherent link layers connected to the plurality of interconnected protocol engines, wherein a first coherent link layer of the plurality of coherent link layers provides the coherent interface.

4. The computer system according to claim 3, wherein the network interface controller is connected with the plurality of coherent link layers.

5. The computer system according to claim 3, wherein the integrated network interface of the cache coherent node controller is connected to one network switch to form a 1-dimensional fat tree topology.

6. The computer system according to claim 3, wherein the integrated circuit in the cache coherent node controller further comprises a plurality of integrated network interfaces, wherein the plurality of integrated network interfaces are connected to two network switches to form a 2-dimensional fat tree topology.

7. The computer system according to claim 3, wherein the integrated circuit in the cache coherent node controller further comprises a plurality of integrated network interfaces, wherein the plurality of integrated network interfaces are connected to three network switches to form a 3-dimensional fat tree topology.

8. The computer system according to claim 3, wherein the integrated circuit in the cache coherent node controller further comprises a plurality of integrated network interfaces, wherein the plurality of integrated network interfaces are connected to four network switches to form a 4-dimensional fat tree topology.

9. The computer system according to claim 3, wherein the integrated circuit in the cache coherent node controller further comprises n network interfaces connected to n network switches to form an n-dimensional fat tree topology.

10. The computer system according to claim 2, wherein the plurality of network switches are selected from a group consisting of: an Omnipath switch, an InfiniBand switch, a Gen-Z switch or an Ethernet switch.

11. The computer system according to claim 2, wherein connection between the node and the plurality of network switches is provided by fiber optic links to the plurality of network switches.

12. A cache coherent node controller comprising:
a first network interface controller comprises a first integrated network interface;
a second network interface controller comprising a second integrated network interface,
wherein the first integrated network interface and the second integrated network interface are configured for communication with a plurality of nodes in a high performance computing (HPC) system using a first plurality of ports in an integrated circuit;
a first coherent interface configured for communication with a first microprocessor over a first coherent link layer; and a second coherent interface configured for communication with a second microprocessor over a second coherent link layer, wherein the first coherent interface and the second coherent interface are configured for communication with the first microprocessor and the second microprocessor using a second plurality of ports in the integrated circuit that are different from the first plurality of ports.

* * * * *